US009086002B2

(12) United States Patent
König

(10) Patent No.: US 9,086,002 B2
(45) Date of Patent: Jul. 21, 2015

(54) RESONATOR SILENCER FOR A RADIAL FLOW MACHINE, IN PARTICULAR FOR A RADIAL COMPRESSOR

(75) Inventor: Sven König, Duisburg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/002,792

(22) PCT Filed: Feb. 9, 2012

(86) PCT No.: PCT/EP2012/052160

§ 371 (c)(1), (2), (4) Date: Oct. 3, 2013

(87) PCT Pub. No.: WO2012/116880

PCT Pub. Date: Sep. 7, 2012

(65) Prior Publication Data

US 2014/0020975 A1 Jan. 23, 2014

(30) Foreign Application Priority Data

Mar. 3, 2011 (DE) ......................... 10 2011 005 025

(51) Int. Cl.

| | |
|---|---|
| ***B64F 1/26*** | (2006.01) |
| ***F01N 1/02*** | (2006.01) |
| ***F04D 29/66*** | (2006.01) |
| ***F01D 1/06*** | (2006.01) |
| ***F01D 9/02*** | (2006.01) |
| ***F04D 29/42*** | (2006.01) |
| ***F04D 29/44*** | (2006.01) |
| *B64F 1/00* | (2006.01) |
| *F01N 1/00* | (2006.01) |
| *F04D 29/00* | (2006.01) |

(52) U.S. Cl.

CPC .. *F01N 1/02* (2013.01); *F01D 1/06* (2013.01); *F01D 9/02* (2013.01); *F04D 29/4206* (2013.01); *F04D 29/444* (2013.01); *F04D 29/665* (2013.01); *F05D 2260/96* (2013.01)

(58) Field of Classification Search

CPC ..... F04D 29/66; F04D 29/663; F04D 29/665; F01N 1/00; F01N 1/003; F01N 1/02; F01N 1/026; F01N 1/06

USPC ......... 181/217, 218, 210, 250, 224, 225, 226; 415/119, 203

See application file for complete search history.

(56) References Cited

U.S. PATENT DOCUMENTS

| | | | | | |
|---|---|---|---|---|---|
| 3,362,629 | A | * | 1/1968 | Papapanu | 415/200 |
| 3,545,566 | A | * | 12/1970 | Abrahamsson | 181/241 |
| 4,411,592 | A | * | 10/1983 | Traver et al. | 415/119 |

(Continued)

FOREIGN PATENT DOCUMENTS

| | | | |
|---|---|---|---|
| CN | 101504015 | A | 8/2009 |
| DE | 273300 | A1 | 11/1989 |

(Continued)

*Primary Examiner* — Edgardo San Martin

(57) ABSTRACT

A volute for a radial turbomachine is proposed. The turbomachine includes a radial compressor or a radial turbine. The volute is in particular for a radial compressor. The volute has a substantially annular cavity which is delimited at least by a first radial side surface. At least one substantially annularly circumferential groove is formed in the side surface.

9 Claims, 4 Drawing Sheets

(56) References Cited

U.S. PATENT DOCUMENTS

| | | | | |
|---|---|---|---|---|
| 4,504,188 | A * | 3/1985 | Traver et al. | 415/1 |
| 6,550,574 | B2 * | 4/2003 | Liu | 181/286 |
| 6,575,696 | B1 * | 6/2003 | Lyons et al. | 415/119 |
| 6,623,239 | B2 * | 9/2003 | Sahay et al. | 415/119 |
| 6,669,436 | B2 * | 12/2003 | Liu | 415/1 |
| 6,918,740 | B2 * | 7/2005 | Liu | 415/1 |
| 7,014,421 | B2 * | 3/2006 | French | 415/197 |
| 7,722,316 | B2 * | 5/2010 | Scarinci et al. | 415/119 |
| 8,197,188 | B2 * | 6/2012 | Clay et al. | 415/119 |
| 8,272,834 | B2 * | 9/2012 | Lefevre | 415/119 |
| 8,506,234 | B2 * | 8/2013 | Brooks et al. | 415/9 |
| 8,596,413 | B2 * | 12/2013 | Seib | 181/292 |
| 2003/0085071 | A1 * | 5/2003 | Boast et al. | 181/249 |
| 2004/0071546 | A1 * | 4/2004 | Werner et al. | 415/119 |
| 2004/0094360 | A1 * | 5/2004 | Toyoshima | 181/249 |
| 2009/0229280 | A1 | 9/2009 | Butler | |
| 2010/0278635 | A1 * | 11/2010 | Schoeman | 415/119 |
| 2011/0097194 | A1 * | 4/2011 | Schick et al. | 415/119 |

FOREIGN PATENT DOCUMENTS

| | | | |
|---|---|---|---|
| DE | 4438611 | C1 | 5/1996 |
| DE | 60114484 | T2 | 8/2006 |
| DE | 60120769 | T2 | 5/2007 |
| DE | 60310663 | T2 | 10/2007 |
| EP | 1443217 | A2 | 8/2004 |
| EP | 1602810 | A1 | 12/2005 |
| EP | 1356168 | B1 | 8/2006 |
| EP | 2063130 | A1 | 5/2009 |
| KR | 20030018545 | A | 3/2003 |
| WO | WO 2005124159 | A1 * | 12/2005 |

* cited by examiner

RESONATOR SILENCER FOR A RADIAL FLOW MACHINE, IN PARTICULAR FOR A RADIAL COMPRESSOR

CROSS REFERENCE TO RELATED APPLICATIONS

This application is the US National Stage of International Application No. PCT/EP2012/052160 filed Feb. 9, 2012 and claims benefit thereof, the entire content of which is hereby incorporated herein by reference. The International Application claims priority to the German application No. 10 2011 005 025.6 DE filed Mar. 3, 2011, the entire contents of which is hereby incorporated herein by reference.

FIELD OF INVENTION

The invention relates to a diffuser for a radial compressor, which diffuser has a substantially annular hollow chamber which is delimited at least by a first radial side surface.

BACKGROUND OF INVENTION

Radial compressors are known for example from EP 1 356 168 B1 or from EP 1 602 810 A1.

Such radial compressors are composed of a rotor or vane impeller which forms a compressor stage and which rotates about an axis of rotation and which has—with respect to the axis of rotation of the rotor—an axial inlet and a radial outlet. Gas to be compressed flows axially into the rotor of the compressor stage and is then diverted outward (radially, radial direction), wherein said gas exits the rotor at high speed.

Kinetic energy of the gas to be compressed which exits at high speed is then converted in a diffuser into potential energy in the form of pressure.

Such a diffuser is usually formed by two non-rotating rings which form an annular hollow chamber or an annular chamber, which annular chamber radially adjoins the rotor outlet, or which rings or annular walls/side surfaces adjoin the rotor outlet radially and are perpendicular to the axis of rotation or are at a highly obtuse angle with respect to said axis of rotation (radial annular chamber walls/radial side surfaces).

The gas exiting the rotor is conducted radially outward in said annular chamber between said two annular walls and passes to a collector.

Diffusers commonly have vanes, that is to say a blade arrangement, for diversion and improved control of the slowing of the flow.

It is also known that such radial compressors exhibit relatively high sound emissions or noise levels which constitute a (noise) disturbance in the surroundings of the radial compressor. Said sound emissions may furthermore also cause vibrations and structure-relevant malfunctions.

Dominant sound sources in a radial compressor are for example typically generated at the location of the vane impeller and of the diffuser inlet or any diffuser blades, owing to the high speed of the fluids flowing through said regions and owing to an interaction of rotor and stator components.

In particular, it is known here that radial compressors generate complex, transient, three-dimensional, rotating and/or pulsating pressure fields or sound fields at an outlet from the radial compressor (pressure side), for example at a pressure connection piece at said outlet, the sound waves of which pressure fields or sound fields propagate without disruption into the pipelines adjoining the pressure connection piece.

Here, in addition to the said noise disturbances, vibrations and structure-relevant malfunctions, pipeline vibrations may also occur which may lead to damage to the pipelines to the point of failure of the radial compressor or of the superordinate system that has the radial compressor.

The damping of such complex, transient, three-dimensional, rotating and/or pulsating pressure fields or sound fields is technically difficult.

Taking this as a starting point, efficient sound damping measures are necessary for sound-emission-generating radial compressors of said type.

Various “external” measures for limiting sound emissions, such as housings or casings, are known. Said noise reduction techniques may be relatively expensive, in particular if they are marketed as an “aftermarket” add-on product.

Furthermore, “internal” silencers for limiting sound emissions in the case of radial compressors are known.

Silencers in general are devices for preventing sound emissions. It is possible to distinguish between various types of silencers which reduce a generated acoustic power on the basis of different mechanisms. A distinction is made, for example, between adsorption and reflection/resonator silencers.

An absorption silencer such as is known for example from EP 1 602 810 A1 for a radial compressor comprises porous (adsorption) material, generally mineral wool, glass wool or glass fiber, which partially absorbs acoustic energy, that is to say converts said acoustic energy into heat. By means of absorption, primarily upper frequencies of the sound medium are damped in the silencer.

Similar fillings of a corresponding hollow chamber are also proposed in DE 603 10 663 T2, DE 601 20769 T2 and US 2009/229280 A1. DE 601 14 484 T2 discloses a circumferential groove whose depth is enlarged to more than 1.5 times the axial width of the cut-out portion of the compressor wheel.

Absorption silencers have the disadvantage that they are generally unsuitable for high pressures, because—owing to the high pressures—large amounts of energy act on the absorption material, or large amounts of heat must be absorbed by the absorption material, which can lead to damage to the porous material, such as for example a disintegration of the absorption material.

Resonator silencers or reflection silencers, which utilize the principle of acoustic reflection, generally comprise for this purpose multiple cavities or chambers which are passed by the sound medium, wherein reflections occur. As the sound medium passes repeatedly by interior spaces of the chambers, a reduction of acoustic pressure peaks of various frequencies occurs. Said reflections are—in structural terms—generated by impact walls, cross-sectional widenings and narrowings. By means of reflection, it is possible for any desired frequencies of the sound medium to be damped in the silencer.

Such a resonator silencer, based on a Helmholtz resonator principle, for a radial compressor is known from EP 1 356 168 B1 or from EP 1 443 217 A2. In said radial compressor, the diffuser therein has an acoustic lining in the form of an area with numerous bores which act as Helmholtz resonators.

In addition to a radial compressor of said type, a further known form of radial turbomachine is a radial turbine.

Such a radial turbine, such as is known for example from DE 44 38 611 C1, is based on a reversal of the physical principle of a radial compressor, and is accordingly—with corresponding components to those in a radial compressor—traversed by flow in a flow direction opposite to that in said radial compressor.

In radial turbines, too, the described emission problems arise in a corresponding manner.

For example, dominant sound sources in a radial turbine are typically generated at the location of the vane impeller or of a turbine wheel (both also referred to hereinafter for short as “rotor”) and of a turbine guide ring, or any guide ring blades, positioned upstream of the turbine wheel.

Here, too, it is possible for complex, transient, three-dimensional, rotating and/or pulsating pressure fields or sound fields to be generated at a suction side, that is to say at an inlet into the radial turbine, for example at a suction connection piece at said inlet, the sound waves of which pressure fields or sound fields propagate without disruption into the pipelines connected upstream to the suction connection piece.

Taking this as a starting point, efficient sound damping measures are necessary here, too, for sound-emission-generating radial turbines of said type.

SUMMARY OF INVENTION

The invention is based on the object of specifying a silencer which improves the disadvantages from the prior art, is simple to implement and is also simple to install—in a sound-emitting system or device such as a radial turbomachine—and which is suitable in particular for damping sound emissions in the case of a radial compressor or a radial turbine.

The object is achieved by means of a diffuser for a radial turbomachine, in particular a radial compressor, having the features of the independent patent claim.

Said diffuser has a substantially annular hollow chamber, an annular chamber, which is delimited at least by one first radial side surface. According to the invention, at least one substantially annularly encircling groove is formed in said side surface.

Here, said at least one substantially annularly encircling groove, which is open toward the annular chamber via a groove outlet (groove outlet opening), acts as an acoustic resonator, in particular a lambda/4 resonator—hereinafter also referred to for short as merely “resonator”—such that sound waves which pass the groove and which have the same frequency as an (acoustic) natural frequency or resonance frequency of said groove are reflected in a region of a groove outlet, and thus a sound propagation across the groove or across the resonator is reduced.

In this way, the sound propagation in the annular chamber can be reduced, and effective sound damping in the diffuser—and in the radial turbomachine or the radial compressor—can be attained.

By means of a selected geometry or dimensioning of the substantially annularly encircling groove, in particular by means of a depth of the groove, by means of a width/height of the groove or of the groove outlet, by means of a radial position of the groove in the radial side surface, the eigenform (eigenmode) or nodal diameter and natural frequency or resonance frequency of the groove is defined.

The configuration or the (three-dimensional) geometry of the circumferential groove are—in themselves—not subject to any limits as long as the encircling groove forms a cavity or a hollow chamber which acts as an acoustic resonator.

It is thus possible, for example, to realize circumferential grooves with any desired groove shapes, such as circumferential grooves with rectangular, V-shaped or trapezoidal cross section, circumferential grooves with an outwardly sloping wall and/or circumferential grooves in dovetail form and/or circumferential grooves with smooth and/or curved walls in regions or throughout and/or circumferential grooves with undercuts and/or with chambers. Undulating circumferential grooves or circumferential grooves with a stepped groove base are also possible.

Thus, if a sound wave passing the groove has the same eigenform as or an identical nodal diameter to an identical acoustic eigenform in the resonator or the groove, and/or if the sound wave passing the groove has the same natural frequency as the groove, the reflection is particularly effective.

That is to say, through suitable (three-dimensional) dimensioning of the groove, the acoustic natural frequency and the eigenform of the groove can be tuned to a sound wave to be reflected, that is to say to the frequency and eigenform thereof, and it is thus possible by means of the dimensioning of the groove for targeted frequencies to be damped.

In other words, owing to the three-dimensional nature of the substantially annularly encircling groove (also referred to as merely “circumferential groove”), the eigenforms thereof can be set by means of simple geometric parameters such that acoustic pressure patterns of a particular form passing the groove can be reflected in a particularly effective manner.

The form of said passing acoustic pressure patterns may for example be estimated using analytical relationships, for example using a formula according to Tyler & Sofrin.

The geometry of a circumferential groove is simple to manufacture and, owing to the low number of free parameters, such as height, width, depth or shape, offers the possibility of inclusion in an optimization process.

Furthermore, the invention realizes a robust, maintenance-free (sound damping) solution which is not subject to wear even at high pressures and temperatures. The invention thus offers a considerable advantage in relation to approaches based on absorption material.

Since the “silencer” according to the invention is used close to the sound source (rotor and possibly bladed diffuser/possibly bladed guide ring), it is possible, with correct dimensioning, to also reduce the excitation of the rotor by acoustic pressure patterns.

With the use of the circumferential groove in the annular chamber, no further sound insulation measures are required, in particular in the pipeline system. Both a radiation of noise and also the excitation of pipeline vibrations can be considerably reduced. A considerable cost advantage is attained in relation to external silencer solutions.

Pressure losses to be expected are low, as shown both by numerical calculation and also by experiments.

Preferred refinements of the invention will emerge from the dependent claims.

In a preferred embodiment, the at least one first radial side surface has multiple substantially annularly encircling grooves which are in particular situated concentrically with respect to one another. The efficiency of the silencer can be increased by means of a plurality of such circumferential grooves.

Said circumferential grooves may particularly preferably be designed so as to have different dimensions in each case, in particular different depths and/or widths. For example, it may be provided here that the depth and the width of the circumferential grooves become smaller in each case with increasing radial distance to the outside in the annular hollow chamber or annular chamber.

In this way, that is to say by means of a plurality of circumferential grooves, it is possible in a targeted manner for multiple frequencies to be damped, to the point of wide-band sound damping of sound emissions in the radial turbomachine. For example, it is possible to realize a frequency band to be damped of 700 Hertz-2000 Hertz, 700 Hertz-4000 Hertz or 700 Hertz-6000 Hertz.

The efficiency of the "resonator silencer" may be further increased if the annular hollow chamber is delimited by a second radial side surface which is situated axially opposite the first radial side surface, which second radial side surface likewise has a substantially annularly encircling groove or—with a further increase in efficiency—multiple substantially annularly encircling grooves, which are in particular situated concentrically with respect to one another.

On this basis, it may be provided in a further preferred refinement that the one substantially annularly encircling groove of the first radial side surface is situated axially directly opposite, that is to say at the same radial height as, the one substantially annularly encircling groove of the second radial side surface.

Alternatively, however, it may also be provided that the one substantially annularly encircling groove of the first radial side surface is situated opposite the one substantially annularly encircling groove of the second radial side surface with a radial offset, that is to say at a different radial height. This may be advantageous in particular if, owing to elements, for example a blade arrangement, arranged in the annular hollow chamber or annular chamber, there is no space available for a "directly axially opposite arrangement" of the circumferential grooves.

Such a directly axially opposite arrangement, and also a radially offset arrangement of circumferential grooves, may also be provided in the case of in each case multiple substantially annularly encircling grooves, situated concentrically with respect to one another, in the two radial side surfaces. Here, too, the space conditions in the annular chamber (bladed annular chamber) may be decisive for the provision of radially offset circumferential grooves instead of a "directly axially opposite arrangement".

In a further preferred refinement, the natural frequency of the at least one substantially annularly encircling groove is tuned to a frequency to be reflected. The frequency to be reflected may particularly preferably be a vane impeller rotational frequency ("blade passing frequency") of a radial compressor or a second harmonic or third harmonic or fourth harmonic of the vane impeller rotational frequency of the radial compressor. The eigenform of the at least one substantially annularly encircling groove should preferably also be tuned to the eigenform of a sound wave to be reflected.

In a further preferred embodiment, the substantially annular hollow chamber has a blade arrangement.

This may have the result that the at least one substantially annularly encircling groove or multiple such circumferential grooves is or are arranged in a region of the blade arrangement in the annular chamber.

It may also be provided that the at least one substantially annularly encircling groove or multiple such circumferential grooves is or are arranged outside the region of the blade arrangement in the annular chamber.

It may also be provided that the at least one substantially annularly encircling groove has discontinuities. This may be provided for example if the annular chamber has a blade arrangement which prevents a fully encircling groove.

In a further preferred refinement, it is provided that the "(resonator) silencer" is used or realized in a radial compressor, as a diffuser therein. The "silencer" may also be used or realized in a radial turbine at a turbine guide ring positioned upstream of a turbine rotor of the radial turbine.

It may also be provided that—in the case of multiple substantially annularly encircling grooves—said grooves are formed such that a damping action is configured for a large rotational speed range of for example 50% to 105% of a nominal rotational speed of the radial turbomachine or of the radial compressor.

BRIEF DESCRIPTION OF DRAWINGS

Exemplary embodiments of the invention are illustrated in figures, which will be explained in more detail below. In the figures.

DETAILED DESCRIPTION OF INVENTION

Exemplary embodiments: resonator silencer for a radial compressor

Figure 1:
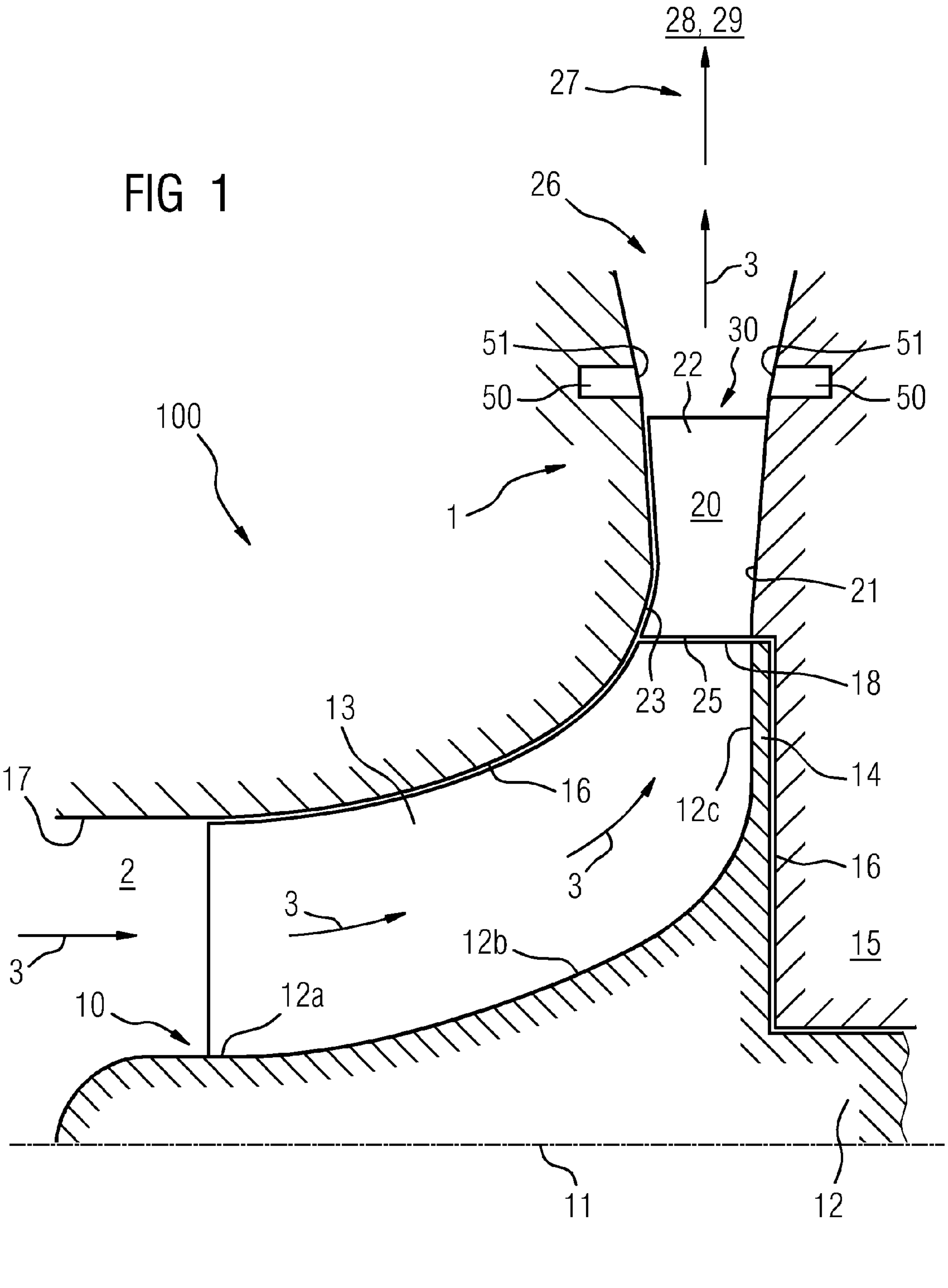
FIG. 1 is a sketched sectional illustration of a radial turbomachine, a radial compressor, having a resonator silencer as per one exemplary embodiment.
Figure 2:
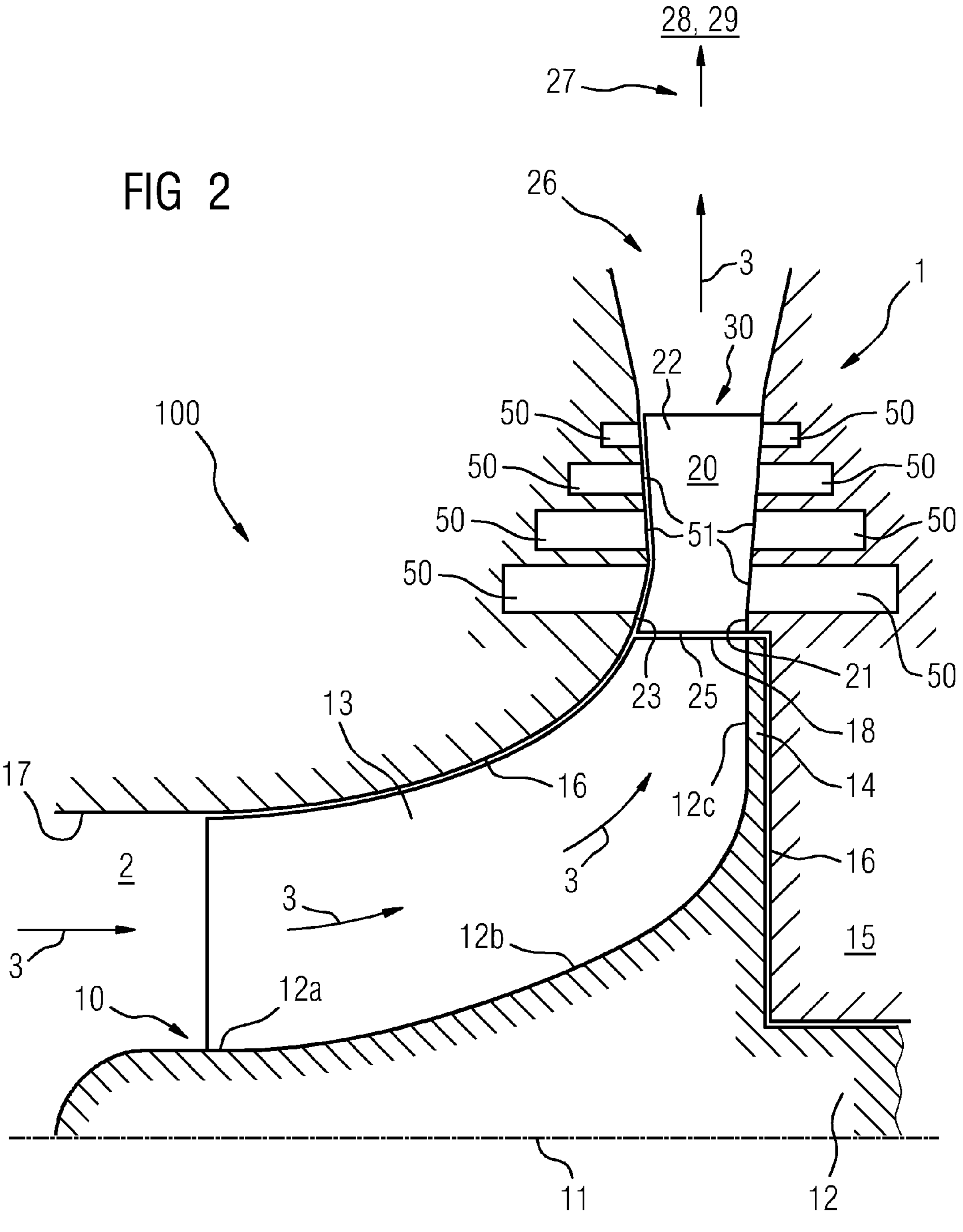
FIG. 2 is a sketched sectional illustration of a radial turbomachine, a radial compressor, having a resonator silencer as per a further embodiment.
Figure 3:
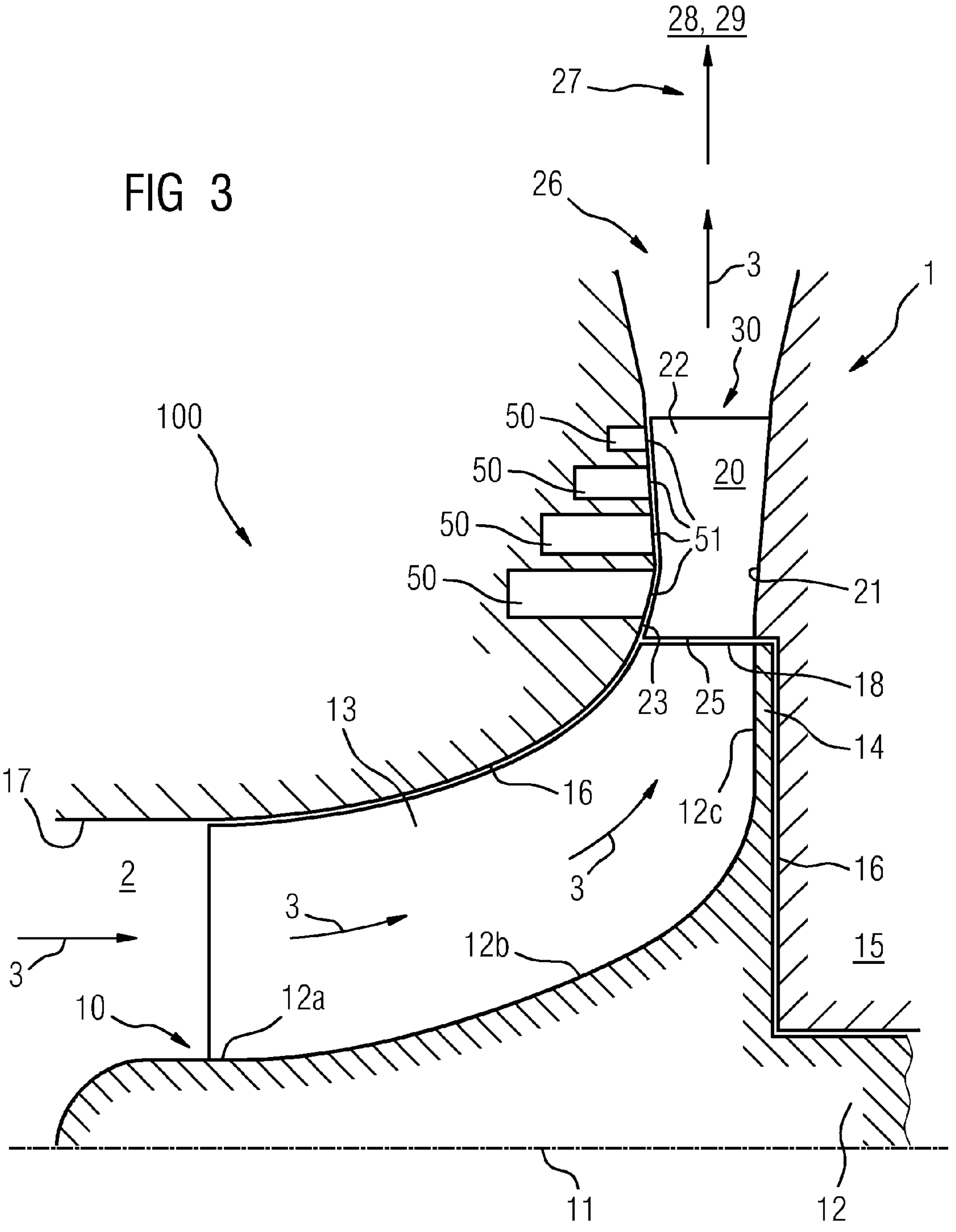
FIG. 3 is a sketched sectional illustration of a radial turbomachine, a radial compressor, having a resonator silencer as per a further embodiment.

FIGS. 1 to 3 illustrate various configurations of radial compressors 100 each with a resonator silencer 1 realized or integrated in the diffuser.

Such radial compressors 100 have, as illustrated, a rotor 10 which rotates at high rotational speed about an axis 11. The rotor 10 has a hub 12 and blades 13 that project radially from said hub.

The hub 12 has a first region 12*a* which is substantially cylindrical, a transition region 12*b* in which the hub radius widens, and an end region 12*c* which runs substantially perpendicular to the axis 11.

The gas 2 that flows in axially in the flow direction 3 is set in rotation by the rotor 10 and exits the rotor 10 in the radial flow direction 3 with respect to the axis 11 and at an obtuse angle with respect to the axis 11.

The blades 13 are fastened to a common backplate 14 of the hub 12. The rotor 10 is situated in a housing 15, the wall 16 of which is adapted to the outer contour of the rotor. The blower formed by the rotor 10 has an axial inlet 17 and a radial outlet 18 which extends over the circumference of the rotor 10.

The outlet 18 is adjoined by the diffuser 20 which is fixedly connected to the housing 15 and which does not rotate. The diffuser 20 has a substantially radial supporting wall 21 to which there are attached vanes 22 (diffuser blade arrangement) which guide the flow passing the outlet 18.

A further substantially radial wall 23 is situated axially opposite the radial supporting wall of the diffuser 20 at a distance therefrom, whereby the diffuser 20 forms an annular chamber, the annular chamber 30, which is occupied by the blade arrangement 22.

The vanes 22 run substantially radially with respect to the axis 11. Between the vanes 22 there are formed diffuser ducts whose cross-sectional area increases from the inside to the outside.

It is the task of the diffuser 20 to slow the gas accelerated by the rotor 10, which gas has high kinetic energy, and to convert the kinetic energy into pressure.

An outlet 26 of the diffuser 20 is adjoined—further downstream—by a pipeline system 29 (not illustrated in any more detail) (pressure side 27), which pipeline system is connected to the diffuser 20 via a pressure connection piece 28.

Radial compressors 100 such as that illustrated generate high sound emissions which constitute a (noise) disturbance in the surroundings of the radial compressor 100 and which can cause vibrations, structure-relevant malfunctions and also pipeline vibrations in/on pipeline systems, which pipeline vibrations lead to damage to the pipelines, to the point of failure of the radial compressor 100.

Dominant sound sources of such emissions are generated at the location of the vane impeller/rotor 10 and of the diffuser inlet 25 or any diffuser blades 22, owing to the high speed of the fluids flowing through said regions.

In particular, complex, transient, three-dimensional, rotating and/or pulsating pressure fields or sound fields are generated at the pressure side 27 or at the pressure connection piece 28, located there, of the radial compressor 100, the sound waves of which pressure fields or sound fields can propagate without disruption into the pipelines 29 adjoining the pressure connection piece 28 and can cause the described damage there.

To prevent such damage, or as an effective sound insulation means, the radial compressors 100—as shown in FIGS. 1 to 3—provide in each case a resonator silencer 1 realized or integrated in the diffuser or in the annular chamber 30 there.

To prevent the propagation of the sound waves in the annular chamber 30 of the diffuser 20, it is the case, as shown in FIGS. 1 to 3, that one or more circumferential/annular grooves 50 that extend annularly around the axis 11 are formed in the radial supporting wall 21 and/or in the radial wall 23, which circumferential/annular grooves act as acoustic resonators, in particular as lambda/4 resonators.

Here, said circumferential grooves 50—which run annularly and concentrically with respect to the axis 11—may be formed in the annular chamber 30 on one side, for example on the radial supporting wall 21 or on the radial wall 23, or else on both sides, that is to say both on the radial supporting wall 21 and also on the radial wall 23.

Said circumferential grooves 50 may also be arranged either only in the region of the blade arrangement 22 of the diffuser or only in the region outside the blade arrangement 22 of the diffuser 20, or else both in and outside the region of the blade arrangement 22 of the diffuser 20.

Sound waves passing through the annular chamber 30 or passing by the circumferential/annular grooves 50, which sound waves have the same frequency as one of the resonance frequencies of such a circumferential/annular groove 50, are reflected and thus damped in the region of the resonator outlet 51, that is to say of the groove opening or of the groove inlet 51.

FIG. 1 shows an embodiment of said resonator silencer 1 which has two circumferential grooves 50 which run in each case annularly around the axis 11 concentrically with respect thereto.

One of the two circumferential grooves 50 is arranged on the radial supporting wall 21. The second of the two circumferential grooves is arranged, at approximately the same radial distance from the axis 11, in the radial wall 23. The two circumferential grooves 50, which are identical in terms of shape, width and depth and which have a U-shaped cross section, are accordingly situated axially directly opposite one another, that is to say at the same radial height.

The radial spacing of said circumferential grooves from the axis 11, or the radial position thereof in the annular chamber 30, is such that both circumferential grooves 50 are situated (radially) outside the bladed region 22 of the diffuser 20 or annular chamber 30.

FIG. 2 shows a further embodiment of a resonator silencer 1 in the diffuser 20, which resonator silencer has a multiplicity of annularly encircling circumferential grooves 50 which are in each case concentric with respect to the axis 11.

A first proportion of said circumferential grooves 50, in this case four circumferential grooves 50, is arranged in the radial supporting wall 21 in the region of the blade arrangement 22 of the diffuser 20. Directly axially opposite said circumferential grooves 50, that is to say in each case at the same radial height or with the same radial spacing to the axis 11, a second proportion of the circumferential grooves 50, likewise four circumferential grooves 50, is arranged on the radial wall 23—and thus likewise in the bladed region 22 of the diffuser 20 or annular chamber 30.

Mutually directly opposite circumferential grooves 50 are in this case in each case identical in terms of shape, width and depth. Here, the width and the depth of the circumferential grooves 50 decreases with increasing spacing from the axis 11. In other words, with increasing radial spacing to the axis 11, the circumferential grooves 50 become slimmer or narrower and shallower. All of the circumferential grooves 50 have a U-shaped cross section.

FIG. 3 shows a further embodiment of a resonator silencer 1 in the diffuser 20, likewise with a multiplicity of annularly encircling circumferential grooves 50 which are in each case concentric with respect to the axis 11.

In said embodiment as per FIG. 3, all of the circumferential grooves 50, in this case four circumferential grooves 50, are arranged, concentrically with respect to one another and concentrically with respect to the axis 11, on the radial wall 23 in the region of the blade arrangement 22 of the diffuser 20. With increasing radial spacing from the axis 11, the width and the depth of the circumferential grooves 50 decrease. In other words, with increasing radial spacing from the axis 11, the circumferential grooves 50 become slimmer or narrower and shallower. Here, too, all of the circumferential grooves 50 have a U-shaped cross section.

Figure 4:
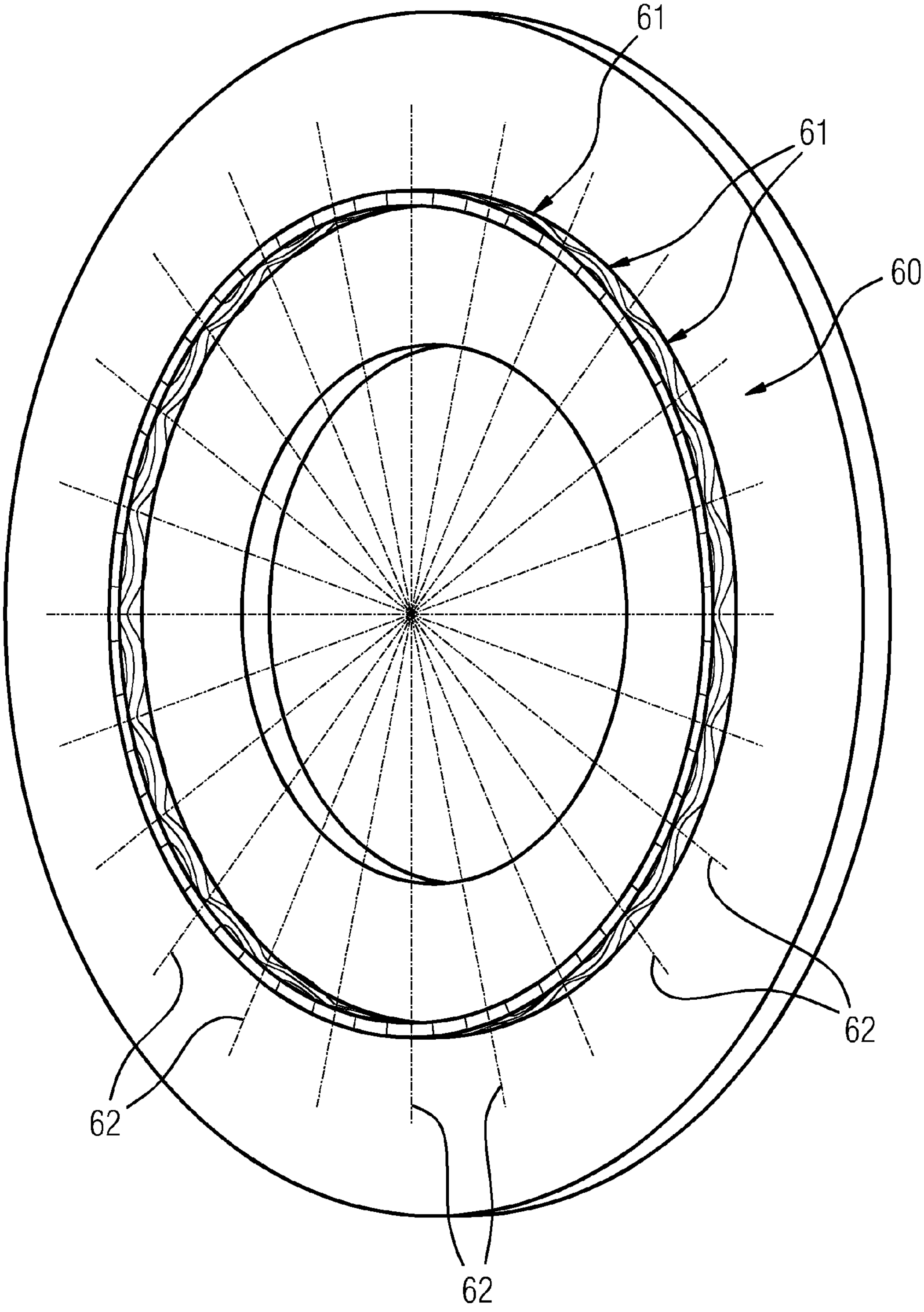
FIG. 4 shows, by way of example, an acoustic eigenmode in an annular groove in a radial compressor as per one embodiment.

FIG. 4 shows, by way of example, an acoustic eigenmode 60 in an annular groove 50 of said type which acts as a resonator.

FIG. 4 shows 24 pressure maxima 61. Said eigenmode or acoustic mode 60 is also characterized by 12 so-called nodal diameters 62 and a particular natural frequency. Sound waves which pass by the circumferential groove 50 and which are characterized by said natural frequency are reflected, and the sound propagation across or past the circumferential groove 50 is reduced.

If the sound wave passing by has the same nodal diameters 62 as the acoustic eigenform 60 in the circumferential groove 50 (resonator), the reflection process is particularly effective.

Resonator silencers 1 such as that described act with extremely high efficiency, in particular because they are used close to the sound source, the rotor 10 and (possibly bladed 22) diffuser 20, such that further complex sound insulation measures, in particular for the entire pipeline system 29 of the radial compressor 100, can be dispensed with.

The invention claimed is:

1. A radial compressor, comprising:

an integrated diffuser, the diffuser comprising:

a substantially annular hollow chamber being delimited at least by one first radial side surface, wherein the at least one first radial side surface comprises at least one substantially annularly encircling, empty circumferential groove which forms an acoustic resonator, wherein a dimensioning of the at least one substantially annularly encircling, empty circumferential groove defines a natural frequency or an eigenform of the substantially annularly encircling, empty circumferential groove, and wherein the natural frequency or the eigenform of the at least one substantially annularly encircling, empty circumferential groove is tuned to a frequency to be reflected or to a sound wave to be reflected.

2. The radial compressor as claimed in claim 1, wherein the at least one first radial side surface comprises multiple substantially annularly encircling, empty circumferential grooves which are in particular situated concentrically with respect one another and have different dimensions comprising different depths or widths respectively.

3. The radial compressor as claimed in claim 1, wherein the annular hollow chamber is delimited by a second radial side surface which is situated axially opposite the first radial side surface, and wherein the second radial side surface comprises a substantially annularly encircling, empty circumferential groove or multiple substantially annularly encircling, empty circumferential grooves situated concentrically with respect to one another.

4. The radial compressor as claimed in claim 1, wherein the one substantially annularly encircling, empty circumferential groove of the first radial side surface is situated opposite the one substantially annularly encircling, empty circumferential groove of a second radial side surface with an axial or radial offset, or wherein a multiple substantially annularly encircling, empty circumferential grooves situated concentrically with respect to one another of the first radial side surface and a multiple substantially annularly encircling, empty circumferential grooves situated concentrically with respect one another of the second radial side surface are arranged opposite one another with an axial or radial offset.

5. The radial compressor as claimed in claim 1, wherein the dimensioning of the at least one substantially annularly encircling, empty circumferential groove comprises a width, a depth, or a radial position of the substantially annularly encircling, empty circumferential groove.

6. The radial compressor as claimed in claim 1, wherein the natural frequency or the eigenform of the at least one substantially annularly encircling, empty circumferential groove is tuned to a vane impeller rotational frequency of a radial compressor in which the diffuser is arranged or tuned to a second harmonic or a third harmonic or a fourth harmonic of the vane impeller rotational frequency of the radial compressor.

7. The radial compressor as claimed in claim 1, wherein the substantially annular hollow chamber comprises a blade arrangement.

8. The radial compressor as claimed in claim 1, wherein the at least one substantially annularly encircling, empty circumferential groove is arranged in a region of a blade arrangement or arranged outside the region of the blade arrangement.

9. The radial compressor as claimed in claim 1, wherein the at least one substantially annularly encircling, empty circumferential groove comprises discontinuities.

* * * * *